US005482660A

United States Patent [19]

Yamamoto et al.

[11] Patent Number: 5,482,660

[45] Date of Patent: Jan. 9, 1996

[54] METHOD FOR FABRICATING AN INK JET HEAD HAVING IMPROVED DISCHARGE PORT FORMATION FACE

[75] Inventors: Hajime Yamamoto; Keiichi Murai, both of Yokohama; Fujihiro Ito, Tsurugashima, all of Japan

[73] Assignee: Canon Kabushiki Kaisha, Tokyo, Japan

[21] Appl. No.: 969,354

[22] Filed: Oct. 30, 1992

[30] Foreign Application Priority Data

Oct. 31, 1991 [JP] Japan .................................. 3-286655
Nov. 18, 1991 [JP] Japan .................................. 3-301871

[51] Int. Cl.[6] .......................... B29C 45/00; B29C 71/04

[52] U.S. Cl. ...................... 264/474; 156/73.1; 156/73.3; 156/242; 156/244.17; 156/244.18; 264/139; 264/162; 264/328.1; 264/328.6; 264/331.14; 264/482; 425/174.2; 425/174.4; 425/289; 451/910

[58] Field of Search .............................. 264/22, 23, 139, 264/127, 331.14, 344, 219, 328.1, 162, 259, 263, 328.5, 328.4, 328.6; 425/174.4, 174.2, 174, 289; 51/595 S, DIG. 11; 346/140 R; 156/242, 245, 244.17, 244.18, 73.1, 73.3

[56] References Cited

U.S. PATENT DOCUMENTS

| | | | |
|---|---|---|---|
| 3,699,719 | 10/1972 | Rozdilsky et al. | 51/59 SS |
| 3,971,311 | 7/1976 | Deproux | 101/93.04 |
| 4,121,328 | 10/1978 | Lindsey | 264/219 |
| 4,248,823 | 2/1981 | Bader et al. | 264/156 |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,689,640 | 8/1987 | Shimomura | 346/140 R |
| 4,723,129 | 2/1988 | Endo et al. | 346/1.1 |
| 4,740,796 | 4/1988 | Endo et al. | 346/1.1 |
| 4,858,264 | 8/1989 | Reinhart | 51/59 SS |
| 4,881,318 | 11/1989 | Komura et al. | 264/272.16 |
| 5,017,946 | 5/1991 | Masuda et al. | 346/140 R |
| 5,185,111 | 2/1993 | Lazer | 264/344 |
| 5,227,098 | 7/1993 | Philby et al. | 264/331.14 |
| 5,320,789 | 7/1994 | Nishii et al. | 264/127 |

FOREIGN PATENT DOCUMENTS

| | | | |
|---|---|---|---|
| 2832891 | 2/1980 | Germany | 425/174.2 |
| 54-56847 | 5/1979 | Japan . | |
| 59-123670 | 7/1984 | Japan . | |
| 59-138461 | 8/1984 | Japan . | |
| 60-71260 | 4/1985 | Japan . | |
| 62-105623 | 5/1987 | Japan | 264/331.14 |

OTHER PUBLICATIONS

Patent Abstracts of Japan, vol. 14, NO. 351 (M–1003) Jul. 30, 1990 & JP-A-02121844 (G. Akira) May 9, 1990.

Patent Abstracts of Japan, vol. 12, No. 206 (M–708) (3053) Jun. 14, 1988 & JP-A-63009550 (Y. Katano) Jan. 16, 1988.

Patent Abstracts of Japan, vol. 13, No. 555 (M–904) Dec. 11, 1989 & JP-A-01228861 (S. Junji) Sep. 12, 1989.

*Primary Examiner*—Jay H. Woo
*Assistant Examiner*—Duane S. Smith
*Attorney, Agent, or Firm*—Fitzpatrick, Cella, Harper & Scinto

[57] ABSTRACT

A method for fabricating an ink jet recording head in which at least liquid channels, discharge ports and a ceiling plate for the formation of an ink liquid chamber are laminated on a substrate having ink discharge energy generating elements arranged on its surface, characterized in that said ceiling plate is formed of a high molecular resin having dispersed water-repellent grains composed of fluoro-oligomer, fluoropolymer, or fluorinated graphite.

17 Claims, 14 Drawing Sheets

METHOD FOR FABRICATING AN INK JET HEAD HAVING IMPROVED DISCHARGE PORT FORMATION FACE

BACKGROUND OF THE INVENTION

1. Field of the Invention

The present invention relates to an ink jet recording head for use in forming an image on a recording medium by jetting fine ink droplets, and a fabrication method therefor.

2. Related Background Art

It is well known to provide a layer excellent in water-repellency (ink-repellency) on the peripheral face of a discharge port, particularly around the discharge port (orifice) as means for retaining the discharge performance safety or improving the performance of an ink jet recording head by a method of applying a fluoropolymer solvent dispersion-liquid such as KP-801 by Shin-Etsu Chemical Co., Ltd. or a method of depositing amorphous alloy thin film.

However, a water-repellent treatment around the discharge port has an intimate relation with the discharge port forming method, and whether it should be performed before or after the discharge port forming process is a key point, because if they do not match consistently, the discharge port precision and the water-repellency around the peripheral face of the discharge port necessary for an ink jet recording head can not be obtained. That is, a conventional example as above mentioned had the following problems in some cases. In the following, the problems associated with the water-repellent treatment on the peripheral face of the discharge port performed before and after the formation of ink liquid channel will be described.

First, when the water-repellent treatment is performed after the formation of the liquid channel, the liquid channel will be also made water-repellent, whether the material is dry sheet-like or liquid, or whether the method is by application or print, or vapor deposition using fluoropolymer or metallic material, so that print deviation may be caused in using the recording head.

That is, in the conventional example with a method in which a photosensitive dry film is pasted on a substrate provided with heat generating elements as the discharge energy generating element and the wirings, and patterned by photolithography technique to form ink liquid channel walls, and then a ceiling plate is bonded thereto, discharge ports are formed by cutting the substrate vertically to a substrate surface at the last step, with its cut surface serving as a discharge port face. With this method, discharge ports themselves are formed by cutting at the same time with the formation of the discharge port face, whereby it is an important consideration how to prevent the water-repellent material entering the liquid channels, and to apply it near the discharge ports, when the water-repellent material is applied subsequently. To this end, the selection of water-repellent material, the adjustment of viscosity, and the development and improvement for the application method will be sought. For example, with a monochrome head (orifice diameter, e.g., ø50 μm) having a resolution of 300 dpi (a pitch of 84.7 μm), and a full-color head (orifice diameter, e.g., ø20 μm) having a resolution of 400 dpi (a pitch of 63.5 μm), it was only possible to seek the optimal material and method for each head having a different discharge port diameter and pitch, in which the resolution thus obtained did not necessarily satisfy the required quality level 100%, and there was a problem that the fabrication yield was not improved. FIG. 4 is a view showing this situation, illustrating that a water-repellent material 13 has entered each discharge port *7a* to *7c*, and there is a site 14 on the peripheral face near the discharge port in which the water-repellent material is not applied. That is, *7a* is a discharge port which the water-repellent material has entered, *7b* is a normal discharge port, and *7c* is a port in which water-repellent material layer is lacking on the peripheral face of discharge port. Note that in the figure, 2 is a substrate, 4 is an ink liquid channel wall, 5 is a buffer layer, and 6 is a glass ceiling plate.

FIGS. 5 and 6 illustrates how an ink droplet is discharged through the discharge ports *7a* and *7c*, respectively. In FIG. 5, the water-repellent material 13 is attached onto the upper portion of the discharge port *7a*, so that an ink droplet 34 in this state is discharged more downward than an axial direction (horizontal direction in this figure) of a liquid channel 8. Note that in FIG. 6, 9 is an ink liquid chamber, 10 is an ink supply port, 11 is a discharge port peripheral face, 12 is a water-repellent material layer, 3 is a discharge energy generating element, and 23 is a connection pad.

As shown in FIG. 6, since the water-repellent material layer 12 on the upper portion of the discharge port peripheral face 11 is lacking, the ink 32 is attached to this portion, and an ink droplet 34 is pulled back by the ink 32 and thus discharged more upward than the axial direction of the liquid channel 8, when the ink is discharged through the discharge port.

On the other hand, with a fabrication method of performing the water-repellent treatment before the formation of discharge ports, the discharge ports are formed after the formation of a water-repellent material layer, so that the discharge port face of the water-repellent material layers has reduced adherence to cause the exfoliation or burrs on the water-repellent material layer, leading to undischarge or print deviation, whether the source material forming the water-repellent material layer is a dry sheet-like or liquid, or whether the method relies on the print or the vapor deposition of fluoropolymer or metallic material.

That is, a conventional example 2 as shown in FIG. 7A may rely on a method in which a photosensitive resin is patterned by photolithography technique on a substrate 2 provided with the discharge energy generating elements and the wirings, and then photosensitive resin portion 19 for use as ink liquid channel is formed and covered with a resin so as to wrap around. With this method, in forming discharge ports, the substrate is cut vertically to a substrate face, with its cut surface serving as a discharge face, but as the discharge port itself is not formed yet, the application of water-repellent material and the surface improvement can be readily made. However, when the photosensitive resin portion 19 corresponding to ink liquid channel is removed by a solvent, the water-repellent material layer corresponding to a discharge port peripheral portion must be removed at high precision correspondingly to an edge of the discharge port. FIG. 7B illustrates this situation. When the photosensitive resin portion 19 in the ink liquid channel portion is removed using a solvent of acetone and an utlrasonic cleaner, the water-repellent material layer on the discharge port peripheral face may produce the exfoliation 17 such as a breakage, or burrs 18, thereby causing wetting deviation or undischarge in the discharge port. When a ceiling plate resin and the water-repellent material are poorly bonded, exfoliation as large as a discharge port may be produced by a blade wiping mechanism of the discharge port provided on a printer if the print is repeatedly made by using such a recording head. Note that 20 is a ceiling plate integrally formed of, for example, epoxy resin.

Another example 3, as shown in FIG. 8A is a method in which a water-repellent material layer 12 is formed on a ceiling plate 15 on which an ink liquid chamber 9, ink liquid channels 8, and a discharge port plate 16 are preformed integrally by injection molding, and then the same layer surface is irradiated by an excimer laser corresponding to a liquid channel pattern to form the discharge ports *7d*, in which method the discharge ports are already completed at the time of molding, rather than the cutting. This method is superior in that the water-repellent material can be applied to the discharge port formation face before the formation of liquid channels by the excimer laser, and the water-repellent material is prevented from entering the liquid channels, but because of using the abrasion phenomenon of the excimer laser in forming the liquid channels, the water-repellent material layer 12 on the edge portion of the discharge port may be peeled off to form peeling portion 17, or conversely may be left as burrs 18, as shown in FIG. 8A and as with the conventional example 2, whereby it can not be said that the problems have been completely resolved including an orifice forming process, even though the problems associated with the application process of water-repellent material have been eliminated. If such a ceiling plate 15 is overlaid on the substrate 2 to assemble a recording head, an ink droplet will be discharged more downward than an axial direction of liquid channel 8 due to a burr 18, as shown in FIG. 8A. Note that *7d* is a discharge port having the water-repellent material protruding as a burr, *7e* is a normal discharge port, and *7f* is a discharge port having the peripheral water-repellent material layer peeled off.

As above described, when the water-repellent material enters the discharge port, or is left like a burr, the meniscus shape of the ink is uneven, with its position retracting partially into the liquid channel unstably, and causes a bend in the discharge direction as a kind of extraneous matter, giving rise to a problem such as poor print quality or deviation. Also, when the water-repellent material layer is not correctly formed on the periphery cf the discharge port, that improper portion is more easily wetted by the ink than other portions, and as the printing is continued, a problem associated with the print quality such as wetting undischarge or wetting deviation of ink droplets may arise.

SUMMARY OF THE INVENTION

In the light of the above-mentioned affairs, an object of the present invention is to provide an ink jet recording head comprising a discharge port face having the water-repellency, which is inexpensive, stable and highly precise, and a fabrication method therefor.

Also, it is another object of the invention to provide an ink jet head in which the quite excellent ink discharge conditions can be maintained stably over a long term owing to its excellent water-repellency, and a fabrication method therefor.

A further object of the present invention is to provide a method for fabricating an ink jet recording head in which at least liquid channels, discharge ports and a ceiling plate for the formation of an ink liquid chamber are laminated on a substrate having ink discharge energy generating elements arranged on its surface, characterized in that said ceiling plate is formed of a high molecular resin having dispersed water-repellent grains composed of fluoro-oligomer, fluoropolymer, or fluorinated graphite.

A still further object of the present invention is to provide an ink jet recording head in which at least liquid channels, discharge ports and a ceiling plate for the formation of an ink liquid chamber are laminated on a substrate having ink discharge energy generating elements arranged on its surface, characterized in that said ceiling plate is made of a high molecular resin having dispersed water-repellent grains composed of fluoro-oligomer, fluoropolymer, or fluorinated graphite.

DETAILED DESCRIPTION OF THE PREFERRED EMBODIMENTS

Figure 1A:
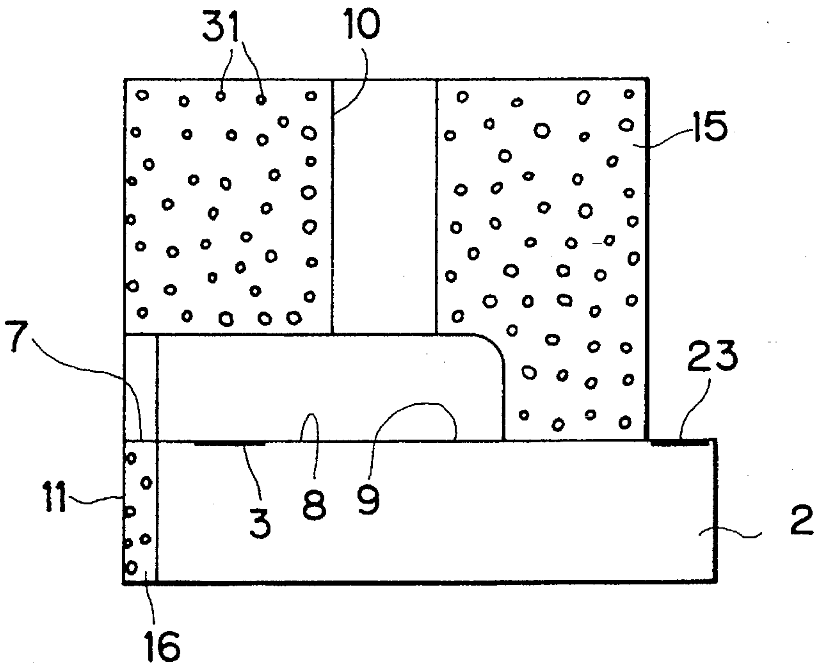
FIGS. 1A and 1B are constitutional views for explaining an example 1 of the present invention.

The preferred embodiments of the present invention will be described below.

The present invention is applied to an ink jet head in which at least discharge ports, ink liquid channels, and a ceiling plate for the formation of ink liquid channels are laminated on a substrate having ink discharge energy generating elements arranged on its surface, as previously described.

The substrate may be made of any one of well known materials such as glass, quartz and ceramic. And the ink discharge energy generating element arranged on the substrate may be a well known electricity-heat converter, for example.

In a fabrication method for the ink jet head according to this embodiment, the ceiling plate is laminated on the substrate having the elements arranged as above described, in which the ceiling plate is made of a high molecular resin having water-repellent grains dispersed.

Preferable examples of water-repellent grains include fluoropolymers such as polytetrafluoroethylene (PTFE), tetrafluoroethylene-perfluoroalkylvinylether copolymer (PFA), or tetrafluoroethylene-hexafluoropolypyrene copolymer (FEP), fluoro-oligomers such as low molecular polytetrafluoroethylene (low molecular PTFE), and fluorinated graphites such as poly (carbon monofluoride), i.e., $(CF)_n$, or poly (dicarbon monofluoride), i.e., $(C_2F)_n$.

The volume average grain diameter of a water-repellent grain is preferably from 0.1 to 5 μm. The grain is preferably below one-tenth the diameter of a liquid channel even in the secondary aggregate, and examples of grain include a trade name Lebron L-5 manufactured by Daikin Industries, Ltd., a trade name TLP-10 series manufactured by Mitsui Dupon Fluorochemical Co., Ltd., and a trade name Hostaflon TF-9202 manufactured by Hekisto. These have improved dispersibility by the surface active agent. It should be noted that though a fluororesin capable of experiencing the compression molding has been recently developed, it can not be used as a forming material as above mentioned, because this resin is expensive, the molding precision is too low to form the ink liquid channel groove of an ink jet recording head, and the ink liquid channel inner wall which must not be made water-repellent may have a high water-repellency.

The grains are preferably subjected to wettability improving treatment beforehand. The treatment method preferably relies on an oxygen plasma using glow discharge, or a nitrogen plasma using corona discharge.

The amount of dispersion of water-repellent grains into a high molecular resin is preferably 5 to 60% of the total weight when blended.

The high molecular resin may be any one of the typical molding resin materials, and in particular polysulfone, polyethersulfone, polyurethane resin and bisphenol A-type epoxy resin are preferable.

In addition to water-repellent grains, a filler may be added. Preferable filler is silica and alumina. The volume average grain diameter of filler is preferably 0.05 to 2 μm, and the additive amount is desirably 5 to 80 wt % relative to the high molecular resin.

After the ceiling plate is laminated on the substrate as previously described, at least the peripheral face around the ink discharge port is irradiated by the excimer laser. It is to be noted that after irradiation of a single ceiling plate with an excimer laser, the ceiling plate may be laminated on the substrate. With this irradiation, the high molecular resin on the peripheral face around the ink discharge port is removed by predetermined abrasion, but as water-repellent grains absorb substantially no ultraviolet radiation, they remain on the peripheral face around the discharge port without being abraded, so that water-repellent grains are exposed protuberantly on the peripheral face around the discharge port, whereby the water-repellency of the peripheral face around the discharge port is securely raised. On the other hand, as the liquid channel wall is parallel to the laser beam, the water-repellency is not raised.

The irradiation energy of laser beam has desirably an energy density of about 100 to 300 mJ/cm$^2$.

The present invention will be specifically described below by way of examples.

<EXAMPLE 1>

Figure 2A:
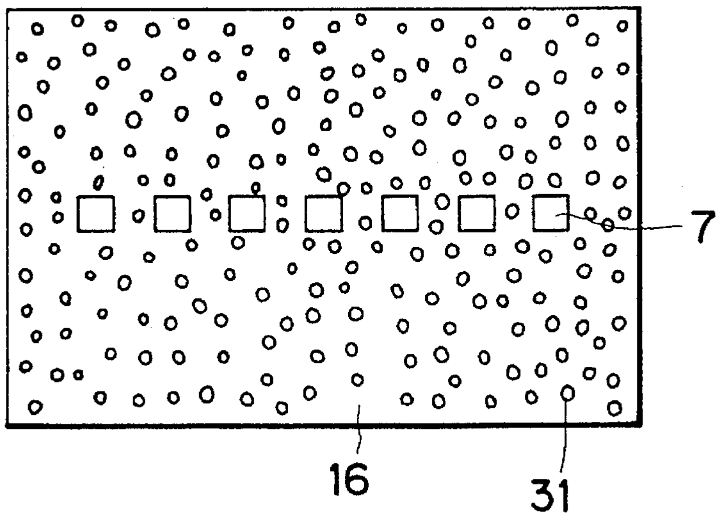
FIGS. 2A and 2B are explanation views showing a state in which laser beam radiation is made in the example 1.
Figure 2B:
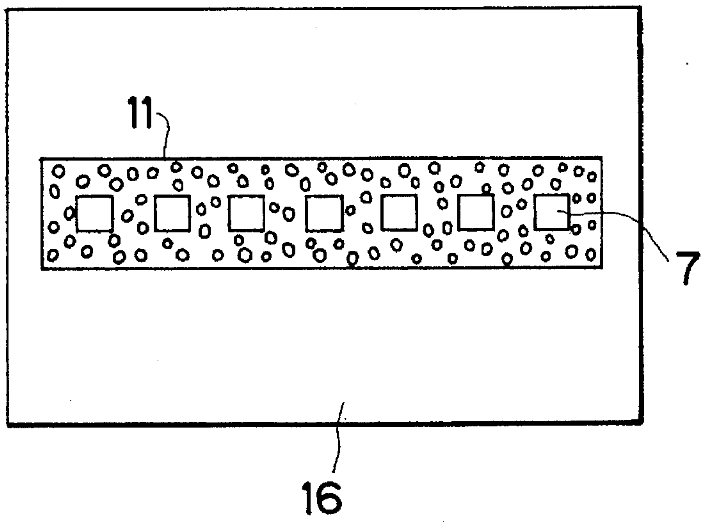

FIGS. 1A and 2B are views illustrating an example 1 of the present invention, based on which the present invention will be described in the following. Using a biaxial extruder and a hot cutter, polysulfone pellets were supplied through a feed port, and a low molecular polytetrafluoroethylene (thereinafter referred to as PTFE) powder made by Central Glass Co., Ltd. (trade name Sefraru loop I) which was subjected to wettability improving treatment was supplied from a first bent port, to produce low molecular PTFE dispersion pellets (containing fifty parts) at a processing rate of 10 kg/Hr. Using these pellets, a ceiling plate having an ink supply port 10, an ink liquid chamber 9, ink liquid channels 8 and a discharge port plate 16 integrally formed therein was injection molded under the conditions where the mold temperature was 150° C. and the pressure holding time was 20 seconds, with a discharge molding machine. The PTFE powder was dispersion molded uniformly like a kind of filler, because it is stable without thermal decomposition at the above molding temperature, and does not react with polysulfone. This is greatly owing to a pretreatment for suppressing the separation into the mold at the time of injection, that is, the $O_2$ plasma treatment which is a wettability improving treatment.

Subsequently, the discharge ports 7 were formed so as to communicate with the ink liquid channels 8 by applying KrF excimer laser beam 28 (a wavelength of 248 nm) corresponding to a discharge port pattern to the discharge port plate 16 (15 μm thick) of the ceiling plate. FIG. 1A shows a state in which a discharge port has been formed. The laser pulse energy density on the discharge port plate face was 1000 mJ/cm$^2$, and the number of pulses was about 150 pulses. The ceiling plate before irradiation of laser beam basically indicates only a water-repellency as large as that of a single substance of polysulfone, because PTFE grains 31 contributing to the water-repellency were buried without appearing on the surface layer of moldings. Therefore, the ink would flow along the inner wall of the ink supply port 10 to introduce the ink, the inner wall of the ink liquid chamber 9, and the inner wall of the ink liquid channel 8 which was most important, without any post-treatment such as hydrophilic treatment, when assembled as a head thereafter, resulting in proper formation of meniscus.

Figure 1B:
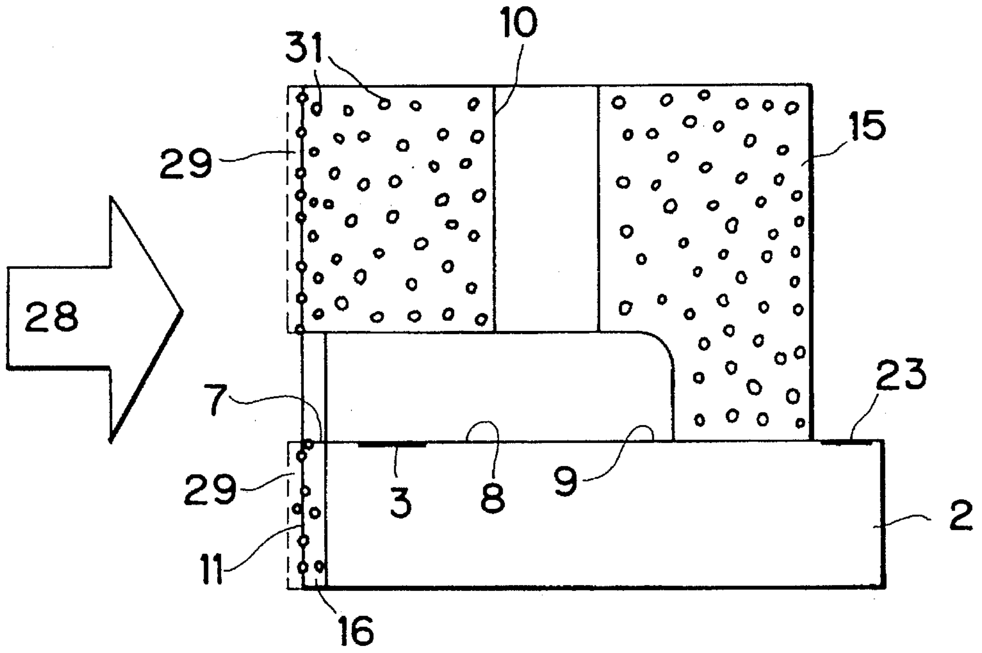

The excimer laser was irradiated over an entire surface of the discharge port plate 16 of the ceiling plate thus obtained. At this time, the power was 200 mJ/cm$^2$ and the number of pulses was about 500 pulses. The discharge port face was subjected to ultraviolet rays of excimer laser, but as PTFE absorbs little amount of ultraviolet rays, the discharge port face was not abraded, and only polysulfone resin surrounding PTFE grains was dug by abrasion. Therefore, the obtained discharge port face was an irregular surface on which PTFE spots appear on a surface layer, as shown in FIG. 1B, whereby the high water-repellency (ink-repellency) and the liquid-wettability ( ink-wettability) of PTFE could be obtained integrally with the ceiling plate of structural member, and the slight irregular surface gave rise to a so-called lotus leaf effect, so that all problems associated with the conventional example were resolved. Note that 29 indicates a portion removed by the abrasion.

It should be noted that the irradiation of laser onto the discharge port plate 16 may be performed over the entire surface of the discharge port plate 16, as shown in FIG. 2A, or only on the peripheral face 11 of the discharge port, as shown in FIG. 2B. When the peripheral face of the discharge port is only irradiated, fine grains of polysulfone having experienced the carbonization due to abrasion are attached to non-irradiated area, indicating the wettability, which is not a significant problem because the ink jet recording apparatus suffices to have a high water-repellency around the discharge port. Also, most of fine grains attached thereto can be removed by rubbing with a discharge port cleaning mechanism provided on a printer. However, to aim at perfection, He gas should be blown as an assist gas to the peripheral face of the discharge port at the time of laser irradiation, in either case of the total face irradiation and the partial irradiation.

The PTFE powder used herein had a volume average grain diameter of about 3 μm, and was difficult to cohere, and the discharge port plate containing the PTFE powder was 15 μm thick in the thinnest portion around the discharge port. It should be noted that it is desirable to perform irradiation at weak energy density and at low frequency, because if the excimer laser is irradiated at a high energy density, PTFE grains scatter away by drastic abrasion. Most of the excimer laser beam which has irradiated PTFE grains will scatter, but if irradiation is performed at a high energy density, PTFE grains do not scatter away but the contact surface with polysulfone may be damaged so as to be weak against the rubbing. Note that the $O_2$ plasma treatment of PTFE powder performed before the production of molding pellets has the effect only on the surface layer, which can be erased by only one time of rubbing with a cleaning blade of the recording apparatus, so that it does not affect the high water-repellency intrinsic to PTFE. This was clarified by the following data as indicated in Table 1.

TABLE 1

| | Contact angle in the ink |
|---|---|
| Peripheral face of discharge port only of polysulfone | 80 to 90° |
| Peripheral face of discharge port before laser irradiation with 50 parts of PTFE grain added | 80 to 95° |
| Peripheral face of discharge port after laser irradiation with 50 parts of PTFE grain added | 100 to 110° |

<EXAMPLE 2>

FIG. 3 is a constitutional view illustrating another example of the present invention. 2 is an Si substrate provided with a heat generating element 3 as discharge means and a wiring, and 19 is a photosensitive resin portion 19 (30 μm in height) corresponding to an ink liquid channel groove connecting to an ink supply port 10, which was formed by patterning on the heat generating element using a positive-type photoresist. 10 is the ink supply port provided on the substrate 2 after formation of the ink liquid channel, in which forming means desirably relies on a ultrasonic abrasive grain process or a sand blast process in the respect of mass productivity and precision.

Figure 3A:
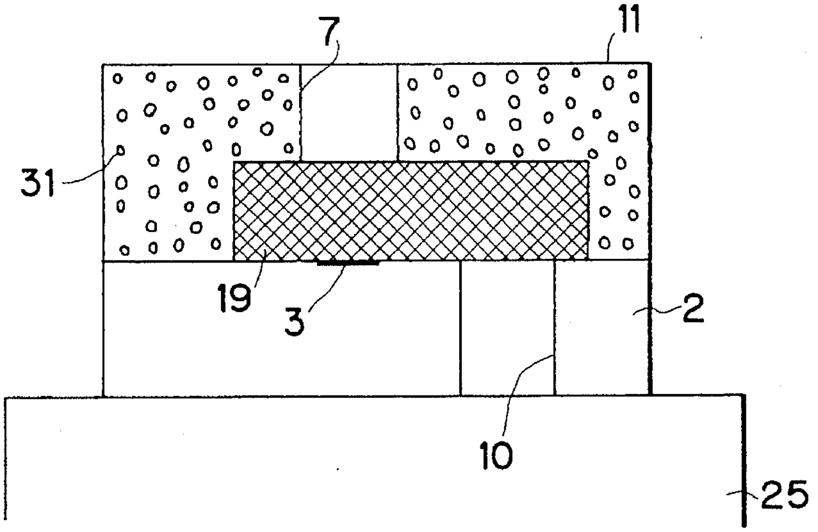
FIGS. 3A and 3B are constitutional views for explaining an example 2 of the present invention.
Figure 3B:
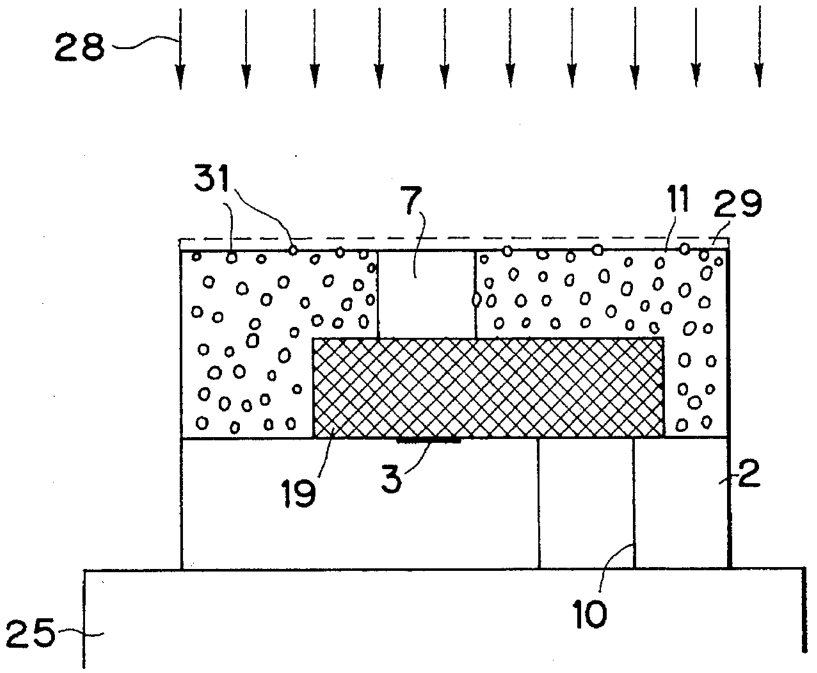
Figure 4:
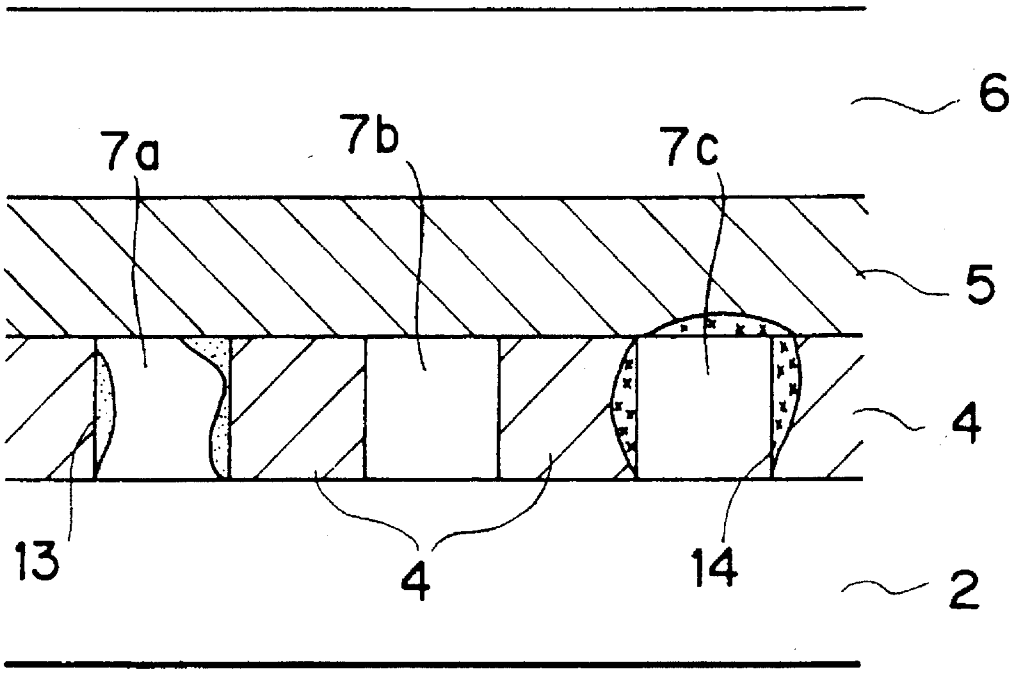
FIG.4 PRIOR ART
FIG. 4 (Prior Art) is an explanation view of discharge port for explaining a conventional discharge port formation and water-repellent treatment.

After a silane coupling agent was applied to the substrate 2 having the resin portion 19 laminated thereon, the substrate 2 was set in a mold, and an epoxy resin with PTFE powder added and mixed was flowed in by a so-called transfer molding, whereby a ceiling plate 20 was formed by curing at a molding temperature of 125° C. so as to cover the resin portion 19 (FIG. 3A). The base resin as used herein was an epoxy resin tablet trade name NT-8506 made by Nitto Denko Corp. 50 parts of PTFE powder (1 μm in volume average grain diameter) was mixed with the base resin, crushed, and the tablet was made again to obtain the molding material. In this case, like the example 1, PTFE grains were buried under the discharge port face, not indicating a high water-repellency, while at the same time PTFE grains were also buried on a bonded face with the substrate 2, so that they could be strongly contacted without exhibiting any high mold releasability specifically found in PTFE. Thereafter, the excimer laser beam corresponding to a liquid channel pattern was irradiated, with the reference of an alignment mark of the Si substrate 2, to form the liquid channel 8 at a predetermined position, and further the excimer laser beam having a low energy density was irradiated to the peripheral face 11 of the discharge port to present the surface of PTFE grain, like example 2 (FIG. 3B ).

The excimer laser beam irradiated to the discharge port peripheral face 11 could be evenly applied by scanning with a moving stage having the substrate 2 thereon. With the above operation, the high precision discharge port 7 was completely formed using the excimer laser, and the highly water-repellent discharge port peripheral face 11 was made up, after which the resin portion 19 composed of a positive-type photoresist was removed by a solvent so as to form a path leading from the ink supply port 10 to the discharge port 7.

This method of irradiating the excimer laser beam along with the scanning allows for the consistent processing of an Si wafer substrate having a large area, for example, 8 inch in diameter, so that the surface of PTFE grain can be presented with the dispersion in the energy density distribution for the emission from an excimer laser main device canceled by scanning, in which such scanning can eliminate any expensive optical system for compensating for the energy density distribution, and resolve the conventional problems associated with the installation cost and running cost.

The example 2 is a side-shoot type in which an ink droplet is jetted perpendicularly to the substrate 2 having the heat generating element as discharge means, which may be replaced with a piezoelectric element, but it will be appreciated that the example 2 may be a so-called edge-shoot type in which an ink droplet is jetted horizontally to the substrate 2, like the example 1. The epoxy-type resin was selected because it is ink proof, but this is not limiting, and polyurethane resin may also be satisfactory.

Note that when a filler such as silical as well as PTFE, are added, the free-cutting in cutting the substrate can be obtained in addition to the above-mentioned feature, and is effective in the form in which the cut surface provides a discharge port.

By the way, in the fabrication method as previously described, when a substrate formed with electricity-heat converters was cut, a resin bond very thin blade or a metal bond very thin blade was used as a cutting blade, and the clogging of the cutting blade was removed in such a manner as to set a certain dress interval and cut a dress board by GC (Green Carborundum) abrasive grains. That is, the on-line dressing process with the cutting blade was necessary.

In general, the head has a cut layer constituted of a composite material including organic material and inorganic material, so that the selection of the cutting blade was quite difficult.

Conventionally, a resin bond blade was most preferable as the cutting blade for uniformly cutting each layer and superior .in the autogenous action. On the other hand, in the fabrication of an ink jet recording head, minute processing is required, for example, in order to obtain as many heads as possible from a single substrate, the width of line to be cut was restricted to a range of about 0.1 to 0.3 mm. Therefore, the amount of projection from the flange for securing to the cutting device was large, the resin bond blade with less rigidity resulting in such a phenomenon that the cut face was obliquely made and the cutting blade was moved in a zigzag direction not to allow for straight cutting, or clogging arose due to the sticking of resin layer to be cut out to impede the autogenous action of the resin bond blade and to prevent cutting, in some cases leading to damage of the cutting blade or member.

That is, the conventional cutting process had the following problems.

(1) There were some instances in which the ink discharge characteristics of the ink jet recording head after fabrication had some dispersion, because the aimed portion could not be cut and the distance from the energy generator to the ink discharge port was unstable.

(2) The clogging of the resin bond blade might occur due to the sticking of resin layer, and the blade was moved in a zigzag direction, causing a large deflection of the blade lateral face during the cutting process, so that the flaw or defect on the resin layer arose in the peripheral portion around the ink discharge port, which was a great factor in the decrease of fabrication yield.

(3) In the resin bond blade, the autogenous action of abrasive grains was excellent, but the clogging might easily occur due to fusion with the resin, so that the dress interval was shorter, the dressing process was complex, and the wear of the cutting blade was severe, whereby the fabrication efficiency was impaired due to the decrease of the blade life.

(4) In the metal bond blade, the cutting blade was less worn away, with little autogenous action, so that the dressing process was complex, whereby the fabrication efficiency was decreased.

Figure 10:
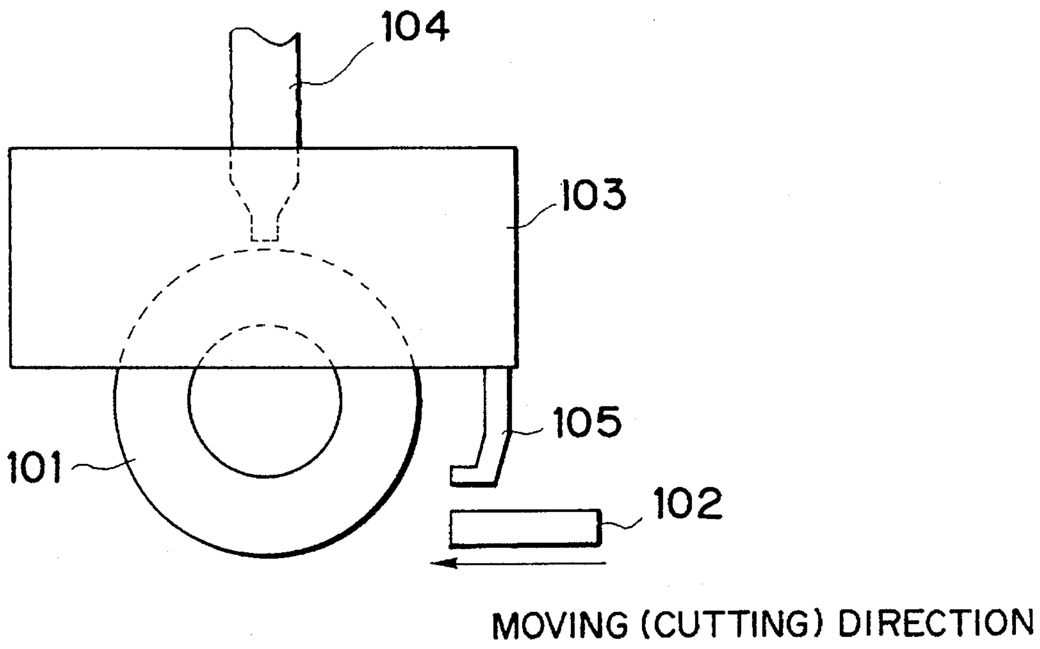
FIG. 10 is a schematic view illustrating an example of a head substrate cutting device.

In the following, a cutting method of the substrate for improving the conventional problems will be described with reference to the drawings. FIG. 10 is a schematic view exemplifying a fabricating apparatus for an ink jet recording head. In the same figure, 101 is a cutting blade, 102 is a cut member which becomes an ink jet recording head, 103 is a cutting blade cover, 104 is a ultrasonic energy applying nozzle, and 105 is a cutting water supply nozzle.

Referring to FIG. 10, the cutting process will be described. A wafer having the elements formed thereon was fixed on a jig by using an air chuck or hot melt-type adhesive. After making the alignment on a cutting machine on the basis of a predetermined pattern on the wafer, the wafer was cut in a predetermined size. At this cutting process, the ultrasonic vibrating pure water was supplied in a thickness direction of the cutting blade through the ultrasonic applying nozzle secured to the cutting blade cover 103, as shown in FIG. 10. Chips sticking to the cutting blade 101 were removed with the cavitation action of the liquid having this ultrasonic energy.

The fixing position of the ultrasonic applying nozzle is not limited to the upper portion as shown in FIG. 10, but may be a position not interfering with other components of the cutting machine. Herein, the supply pressure of pure water was from 0.5 $Kg/cm^2$ to 5 $Kg/cm^2$, and the amount of supply water was suitably from about 0.5 L/min to 5 L/min. The supply direction, the water pressure and the water amount were determined depending on the influence on the cutting precision as well as the dressing effect. That is, the supply direction to remove the sticking matter to the cutting blade is effectively in a direction from both lateral faces of the cutting blade, but the cutting accuracy may be decreased due to the vibration or shaking of the cutting blade caused by the supply from the lateral faces. It is a top end portion of the blade in a thickness direction thereof that can most easily cause the clogging, and lead to the increase of the cutting resistance. The pressure and the water amount were determined based on the reason that the removal effect of sticking matter was evident above a lower limit value, and the decrease in the cutting accuracy due to vibration or shaking of the cutting blade was significantly less below an upper limit value.

From the cutting water nozzle 105, the pure water was supplied near a contact point between the cutting blade 101 and the cutting member 102 for the exclusion of sticking matter removed with the effect of the ultrasonic applying nozzle 104, and the cooling of abrasive grains and the cutting member. An ink jet recording head thus fabricated had an excellent cut surface.

Figure 11:
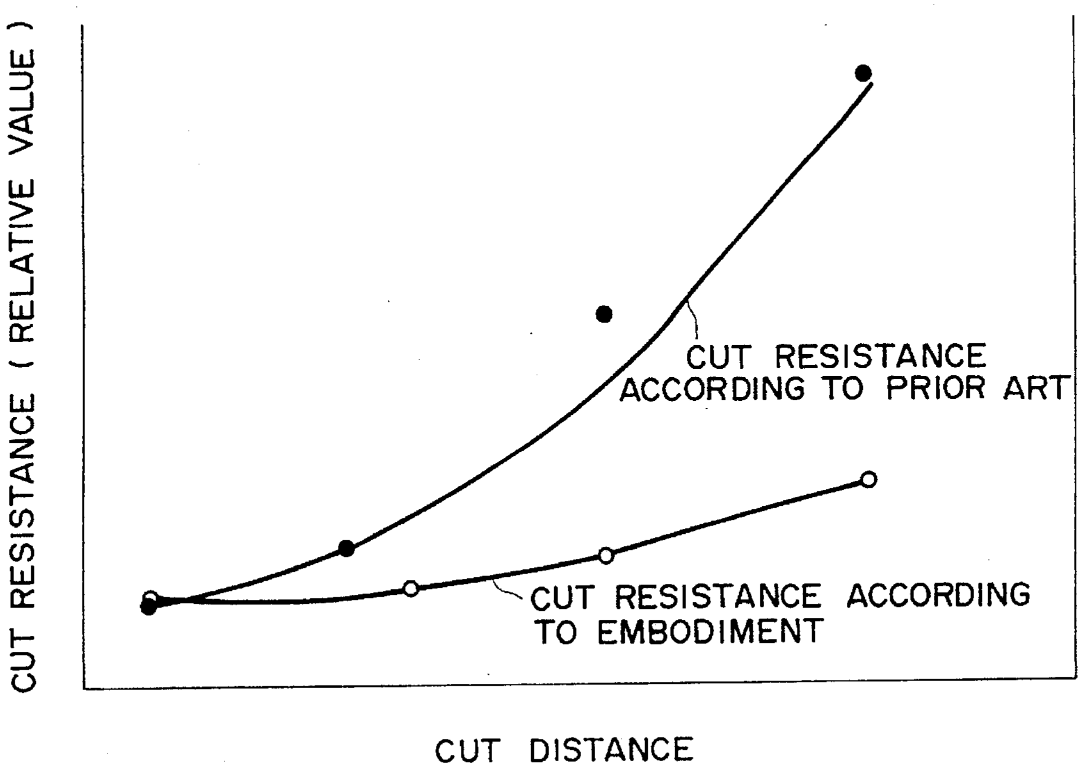
FIG. 11 is a graph representing the variation of cut resistance with respect to cut distance (cut removal amount) in the cutting device as shown in FIG. 10 in terms of the consumption power of a spindle motor.

FIG. 11 is a graph representing the cutting resistance by plotting the consumption power of a spindle motor for the driving of a cutting blade. As can be apparent from FIG. 11 indicating that the variation of the cutting resistance is small, the clogging can be removed during the cutting in this example, that is, the in-process dressing is possible. Thereby the dressing with a dress board was unnecessary, so that the improvement in the life of cutting blade, the stability of the cutting process, and the improvement of the fabrication yield could be attained.

Figure 12:
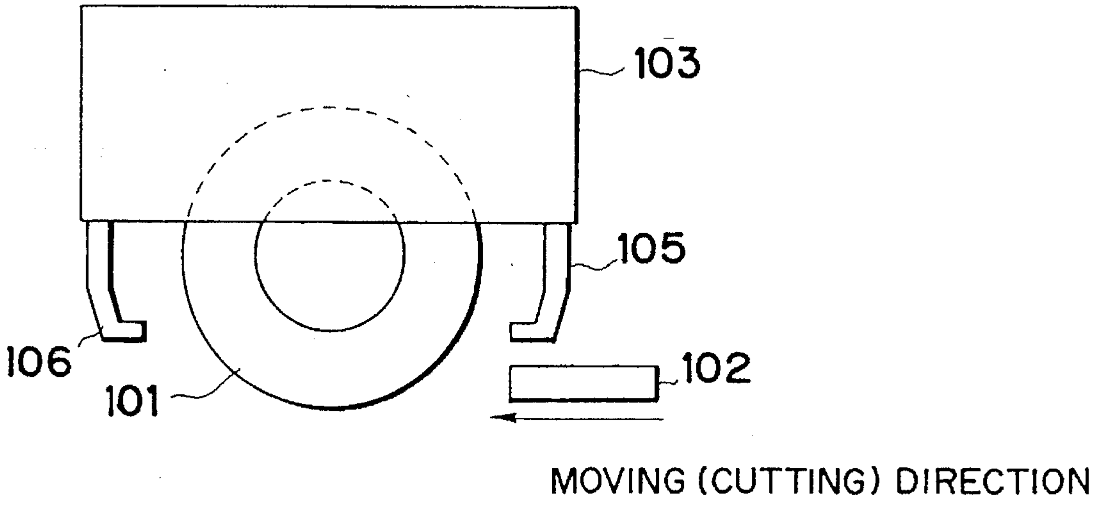
FIG. 12 is a schematic view illustrating another example of a head substrate cutting device.

Though the excellent cutting can be achieved by a cutting apparatus as shown in FIG. 12, the cutting process of that apparatus will be described below. 106 is a nozzle for supplying the pure water having fine abrasive grains dispersed therein near a contact point between the cutting blade and the cutting member. Examples of dispersed fine abrasive grains include colloidal silica, SiC, GC (Green Carborundum), and $Al_2O_3$, among which even and fine colloidal silica is preferable in order not to cause the blade abrasion on the cutting blade due to greater dressing effect than is necessary, and to provide the polishing action of the cut surface of the cutting member with the contact rubbing with the cutting member by supplying fine abrasive grains near the contact point with the cutting member due to entraining with the cutting blade. In this example, Snowrex 30 (trade name: manufactured by Nissan Chemical) was used. The fixing position of fine abrasive grain supply nozzle 106 is not limited to that as shown in FIG. 12, but may be a position not interfering with other components of the cutting machine, and at which abrasive grains can be supplied near a contact point between the cutting blade and the cutting member.

Figure 13:
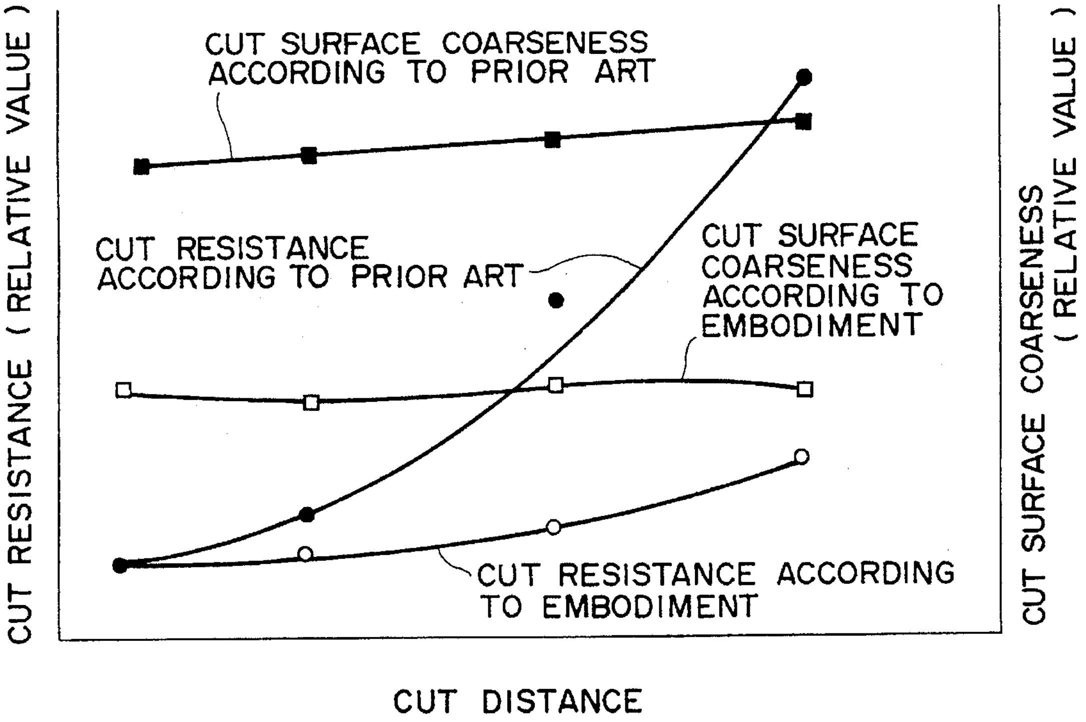
FIG. 13 is a graph representing the variation of cut resistance and the cut surface coarseness, in comparison, with respect to cut distance (cut removal amount) in the cutting device as shown in FIG. 12.

As shown in FIG. 13 representing the comparison between the variation of cutting resistance and the cut surface coarseness with respect to cutting distance (cutting removal amount), excellent results of the cut surface coarseness could be obtained with the increase of cutting resistance suppressed by this example. That is, according to this cutting example, the polishing effect of cut surface as well as the dressing effect of cutting blade are provided at the same time, with a high quality of cutting.

Figure 14:
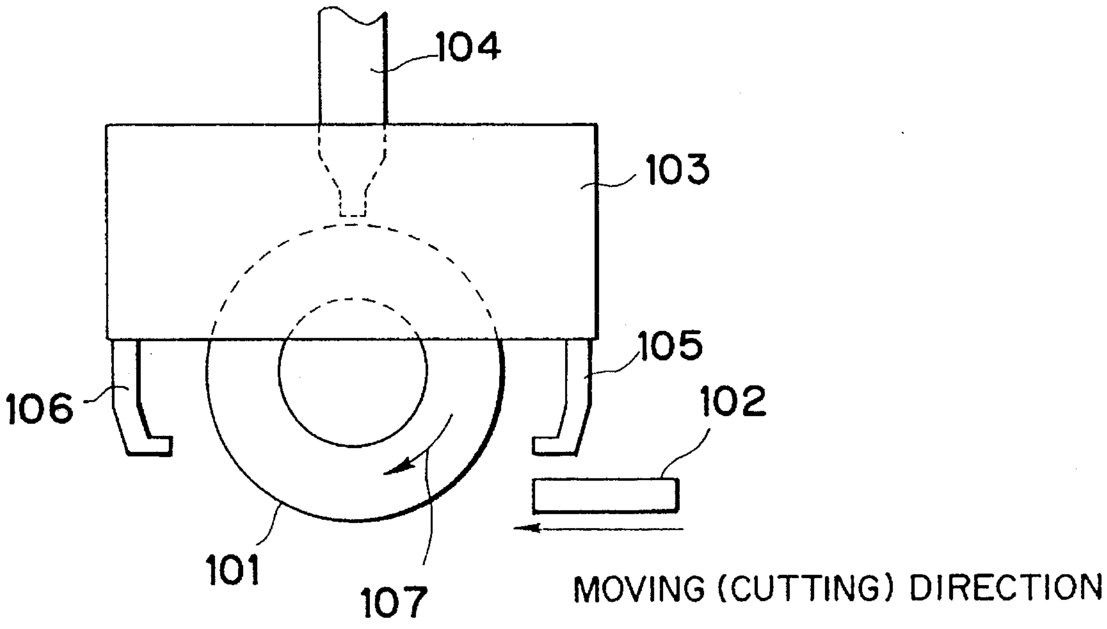
FIG. 14 is a schematic view illustrating another example of a head substrate cutting device.

Referring now to a schematic view of FIG. 14, another cutting process will be described. In FIG. 14, 101 is a cutting blade, 102 is a cutting member, 103 is a cutting blade cover, 104 is an ultrasonic applying nozzle, 105 is a cutting water supply nozzle, 106 is a fine abrasive grain supply nozzle, and 107 is a rotational direction of the cutting blade. The cutting water supply nozzle 105 is provided on the entry side of the cutting blade 101 into the cutting member 102 so as to supply the cutting water near a contact point between the cutting blade and the cutting member. The fine abrasive grain supply nozzle is provided in the opposite side of the cutting water supply nozzle 105, so that abrasive grains are supplied near a contact point with the cutting member 102 by entraining with the cutting blade. The ultrasonic applying nozzle 104 is provided at an intermediate position between the cutting water supply nozzle 105 and the fine abrasive grain supply nozzle 106.

Figure 15:
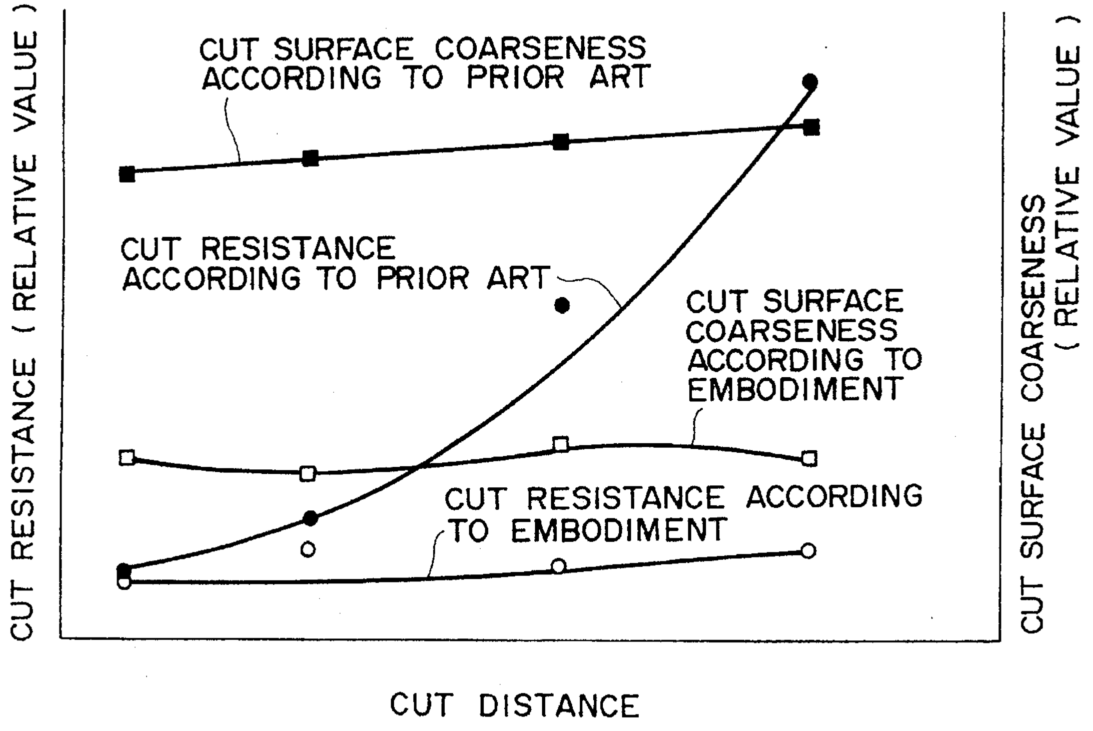
FIG. 15 is a graph representing the variation of cut resistance and the cut surface coarseness, in comparison, with respect to cut distance (cut removal amount) in the cutting device as shown in FIG. 14.

In this cutting example, the liquid containing fine abrasive grains supplied through the fine abrasive grain supply nozzle had both the dressing action and the polishing action near the contact point with the cutting member 102 by entraining with the cutting blade, and simultaneously due to synergism with the cavitation action caused by the ultrasonic applying nozzle 104 on the way of progress, the removal of chips adhering to the cutting blade 101 was easier, with the dressing action promoted, without producing any clogging, whereby the cutting accuracy was stabler, and the polishing action was promoted along with the increase of kinetic energy of fine abrasive grains with the cavitation action, so that excellent cut surface close to a polished surface could be obtained. Note that FIG. 15 is a graph representing the comparison between the cutting resistance variation and the cut surface coarseness with respect to the cut distance (cut removal amount), but with this example, the cutting resistance was further decreased and the cut surface coarseness was excellent.

The cutting method as above described can exhibit the following remarkable effects as compared with the conventional cutting method.

(1) The cutting distance from the energy generator to the ink discharge port is stabler, so that the ink discharge characteristics of ink jet recording head after the fabrication can be stabilized.

(2) As the clogging of the cutting blade due to sticking of cutting member can be effectively removed, the meandering of the blade is unlikely to occur, and the deflection of the blade lateral face during the cutting process is at minimum, so that flaws or defects of the resin layer may not arise in the peripheral portion around the ink discharge port, whereby the formation of excellent discharge ports is possible, and the improvement of fabrication yield and the stabilization of product quality can be attained.

(3) Owing to the polishing action of fine abrasive grains, the ink discharge face coarseness is improved, and the excellent discharge characteristics can be obtained.

(4) Since the compulsory dressing is not made to the cutting blade, the cutting blade is not worn away more than necessary so that the blade life can be improved and the fabrication cost can be reduced.

(5) Since the dressing is possible during the cutting operation, the on-line dressing process is unnecessary, so that the fabrication efficiency can be improved, and the fabrication cost can be reduced.

The present invention brings about excellent effects particularly in a recording head or a recording device of an ink jet recording method for recording by jetting fine ink droplets by the use of the heat energy among the ink jet recording methods.

It is preferable to employ the typical structure and the principle of structures disclosed in, for example, U.S. Pat. No. 4,723,129 and U.S. Pat. No. 4,740,796. The present invention is preferable to using those basic principles. This system can be adopted in a so-called "On-Demand" type and "Continuous" type structures.

Briefly stated, an electrothermal conversion member disposed to align to a sheet or a liquid passage in which liquid (ink) is held is supplied with at least one drive signal which corresponds to information to be recorded and which enables the temperature of the electrothermal conversion member to be raised higher than a nuclear boiling point, so that thermal energy is generated in the electrothermal conversion member and film boiling is caused to take place on the surface of the recording head which is heated. As a result, bubbles can be respectively formed in liquid (ink) in response to the drive signals. Thus, the present invention is effective particularly for the "On-Demand" type. Due to the enlargement and contraction of the bubble, liquid (ink) is discharged through the discharge port, so that at least one droplet is formed. In a case where the aforesaid drive signal is made to be a pulse signal, a further satisfactory effect can be obtained in that the bubble can immediately and properly be enlarged/contracted and liquid (ink) can be discharged while exhibiting excellent responsibility. It is preferable to employ a drive signal of the pulse signal type disclosed in U.S. Pat. No. 4,463,359 and U.S. Pat. No. 4,345,262. Furthermore, in a case where conditions for determining the temperature rise ratio on the aforesaid heated surface disclosed in U.S. Pat. No. 4,313,124 are adopted, a further excellent recording operation can be performed.

In addition to the structure (a linear liquid passage or a perpendicular liquid passage) of the recording head formed by combining the discharge ports, the liquid passage and the electrothermal conversion member as disclosed in the aforesaid specifications, a structure disclosed in U.S. Pat. No. 4,558,333 and U.S. Pat. No. 4,459,600 in which the heated portion is disposed in a bent portion is included in the scope of the present invention, In addition, the present invention can effectively be embodied in a structure in which a common slit is made to be the discharge portion of a plurality of electrothermal conversion members and which is disclosed in Japanese Laid-Open Patent Application No. 59-123670 and a structure in which an opening for absorbing thermal energy pressure wave is formed to align to the discharge port and which is disclosed in Japanese Laid-Open Patent Application No. 59-138461.

Further, the recording head to which the present invention can be effectively applied is a full line type recording head having a length which corresponds to the width of the maximum recording medium which can be recorded by the recording apparatus. This full line head may be a structure capable of realizing the aforesaid length and formed by combining a plurality of recording heads as disclosed in the aforesaid specifications or a structure formed by an integrally formed recording head.

In addition, the present invention can also be effectively adapted to a structure having an interchangeable chip type recording head which can be electrically connected to the body of the apparatus or to which ink can be supplied from the body of the apparatus when it is mounted on the body of the apparatus or a cartridge type recording head integrally formed to the recording head.

Also, addition of a restoration means for the recording means, a preliminary auxiliary means, etc. provided as the constitution of the recording device is preferable because the effects of the present invention can be further stabilized. Specific examples of these may include, for the recording head, capping means, cleaning means, pressurization or suction means, electricity-heat converters or another type of heating elements, or preliminary heating means according to a combination of these, and it is also effective for performing stable recording to perform preliminary mode which performs discharging separate from recording.

Further, as the recording mode of the ink jet recording device, the present invention is extremely effective for not only the recording head only of a primary color such as black, etc., but also a device equipped with at least one of plural different colors or full color by color mixing, whether the recording head may be either integrally constituted or combined in plural number.

Though the ink is considered as the liquid in the embodiments of the present invention as above described, the present invention is applicable to either of the ink solid or liquefying at room temperature. It suffices that the ink may liquefy when a recording enable signal is issued as it is common with the ink jet recording device to control the viscosity of ink to be maintained within a certain range of the stable discharge by adjusting the temperature of ink in a range from 30° to 70° C.

In addition, the excessive temperature elevation of head or ink due to the heat energy can be avoided by positively utilizing the heat energy for the change of state from solid to liquid, or the evaporation of ink can be prevented by the use of the ink stiffening in the shelf state. In any case, the ink having a property of liquefying only with the application of heat energy, such as the ink liquefying with the application of heat energy in accordance with a recording signal so that liquid ink is discharged, or the ink already solidifying upon reaching a recording medium, is also applicable in the present invention.

In this case, the ink may be in the form of being held in recesses or through holes of porous sheet as liquid or sold matter, and opposed to electricity-heat converters, as described in Japanese Laid-Open Patent Application No. 54-56847 or Japanese Laid-Open Patent Application No. 60-71260.

The most effective method for inks as above described in the present invention is based on the film boiling.

Figure 9:
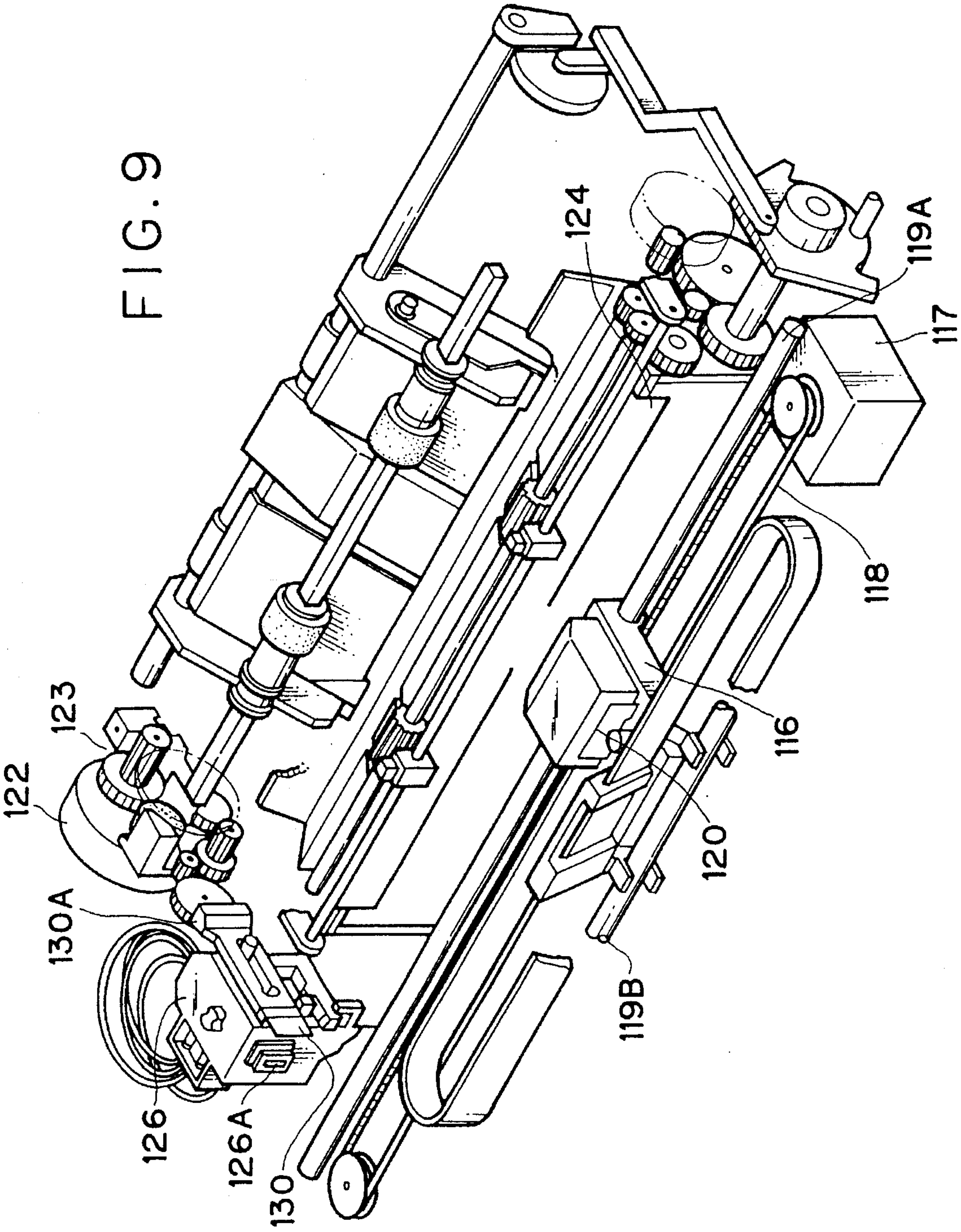
FIG. 9 is a perspective view exemplifying a recording apparatus comprising an ink jet recording head according to the present invention.

FIG. 9 is an external perspective view illustrating an example of an ink jet recording apparatus (IJRA) on which a recording head obtained with this invention is mounted as an ink jet head cartridge ( IJC).

In FIG. 9, 120 is an ink jet head cartridge (IJC) comprising a group of nozzles for discharging the ink to a recording face of a recording sheet fed onto a platen 124. 116 is a carriage HC carrying IJC 120, which connects to a part of a driving belt 18 for transmitting the driving power of the driving motor 117, and which is slidably moved on two guide shafts 119A and 119B disposed in parallel to each other, so that the carriage can be driven in reciprocating movement over the entire width of the recording sheet.

126 is a head recovery device, which is disposed at one end of the travel passage of IJC 120, for example, at a position opposed to a home position. With the dirving force of a motor 122 via a transmission mechanism 123, the head recovery device 126 is operated to make the capping of IJC 120. In connection with the capping of a cap portion 126A of the head recovery device 126 over IJC 120, the discharge recovery processing for the removal of thickened ink within the nozzle by compulsorily discharging the ink through discharge ports is performed by exhausting the ink due to the ink suction with appropriate suction means provided within the head recovery device 126 or the ink compression with appropriate pressure means provided in an ink supply passage to IJC 120. Owing to the capping at the end of recording, IJC can be protected.

130 is a blade as a wiping member disposed on the side face of the head recovery device 126 and formed of silicone rubber. The blade 130 is carried in a cantilever fashion against a blade holding member 30A, and like the head recovery device 126, is operated by the motor 122 and the transmission mechanism 123, thereby making the engagement with a discharge face of IJC 120. Thereby at an appropriate timing during the recording operation of IJC 120 or after the discharge recovery processing using the head recovery device 126, the blade 130 is projected to-the movement passage of IJC 120, to wipe away dewing, wetting and dusts on the discharge face of IJC 120 in the moving operation of IJC 120.

As above described, according to the present invention, the peripheral face of the discharge port requiring the water-repellency can be integrally formed by forming the ink liquid channels and the discharge ports (orifices), after adding fluorine-type water-repellent grains indicating a high water-repellency (ink-repellency) due to its small surface energy to the resin material forming the ink liquid channels, whereby the conventional problems such as the immersion of water-repellent material into the discharge port and exfoliation or burrs of the water-repellent material layer on the peripheral portion of discharge port in forming the discharge ports can be resolved. By the irradiation of excimer laser to the discharge port, fluorine grains appear on the surface layer, so that the stabler discharge face indicating a high water-repellency can be formed, and as the method does not rely on the use of an expensive optical lens system, the irradiation cost of excimer laser beam can be reduced.

What is claimed is:

1. A method for fabricating an ink jet recording head comprising the steps of:

(a) forming a ceiling plate having a discharge port surface, said ceiling plate comprising a high molecular resin and an amount of about 5 to 60% of the total weight of the ceiling plate of dispersed water-repellent grains selected from the group consisting of fluoro-oligomers, fluoropolymers and fluorinated graphites, wherein said water-repellent grains are exposed on at least a discharge port peripheral face by irradiating the discharge port peripheral face with an excimer laser;

(b) laminating said ceiling plate either during step (a) or after step (a) to a substrate with an ink discharge energy generating device arranged on a surface of said substrate to form at least one ink liquid channel communicating with an ink liquid chamber corresponding to said energy generating device; and (c) forming on said discharge port surface at least one discharge port communicating with said at least one ink liquid channel.

2. The method for fabricating an ink jet recording head according to claim 1, wherein said ceiling plate is formed by injection molding.

3. The method for fabricating an ink jet recording head according to claim 1, wherein said ceiling plate is formed by spin coating.

4. The method for fabricating an ink jet recording head according to claim 1, wherein said ceiling plate is formed by either transfer molding or reactive injection molding.

5. The method for fabricating an ink jet recording head according to claim 1, wherein said ceiling plate is formed by optical curing molding.

6. The method for fabricating an ink jet recording head according to claim 1, wherein the step of irradiating the discharge port peripheral face is performed with an excimer laser beam directly obtained from an optical resonator provided on an excimer laser main device, and the discharge port peripheral face and the excimer laser beam are scanned relatively to each other while the excimer laser beam is irradiating the discharge port peripheral face.

7. The method for fabricating an ink jet recording head according to claim 2, wherein the injection molding is performed with an injection molding material having water-repellent grains added to either polysulfone or polyethersulfone.

8. The method for fabricating an ink jet recording head according to claim 3, wherein the ceiling plate is formed with water-repellent grains which are added dispersedly to either polyurethane resin or epoxy resin as the main constituent.

9. The method for fabricating an ink jet recording head according to claim 1, wherein the ceiling plate contains 5 to 70 wt % of a metal filler or ceramics filler.

10. The method for fabricating an ink jet recording head according to claim 9, wherein the water-repellent grains and filler have been subjected beforehand to a wettability improvement treatment for high molecular resin material by either treatment with an oxygen plasma using glow discharge or a nitrogens plasma using corona discharge.

11. The method for fabricating an ink jet recording head according to claim 1, wherein said substrate is cut by a cutting blade prior to said laminating step (b), and in said cutting process, said cutting is performed while removing chips adhering to said cutting blade.

12. The method for fabricating an ink jet recording head according to claim 11, wherein in said cutting process, said cutting is performed by removing chips while supplying a cutting liquid to which ultrasonic vibration energy is applied.

13. The method for fabricating an ink jet recording head according to claim 11, wherein in said cutting process, said cutting is performed while supplying a cutting liquid to which fine abrasive grains are dispersed.

14. The method for fabricating an ink jet recording head according to claim 11, wherein in said cutting process, said cutting is performed while supplying a cutting liquid to which ultrasonic vibration energy is applied and to which fine abrasive grains are dispersed.

15. The method for fabricating an ink jet recording head according to claim 14, wherein in said cutting process, chips adhering to said cutting blade are removed by the cavitation action of the cutting liquid with the application of said ultrasonic vibration energy.

16. The method for fabricating an ink jet recording head according to claim 13, wherein in said cutting process, chips adhering to said cutting blade are removed by a contact rubbing action to said cutting blade with the addition of said fine abrasive grains.

17. The method for fabricating an ink jet recording head according to claim 1, wherein said energy generating device is an electricity-heat converter for generating heat energy.

* * * * *

UNITED STATES PATENT AND TRADEMARK OFFICE
CERTIFICATE OF CORRECTION

PATENT NO. : 5,482,660

DATED : January 9, 1996

INVENTORS : HAJIME YAMAMOTO ET AL.

It is certified that errors appears in the above-identified patent and that said Letters Patent is hereby corrected as shown below:

ON TITLE PAGE

In [56] References Cited, under OTHER PUBLICATIONS: "NO. 351" should read --No. 351--.

COLUMN 1

Line 44, "by" should read --by a--.

COLUMN 2

Figure 5:
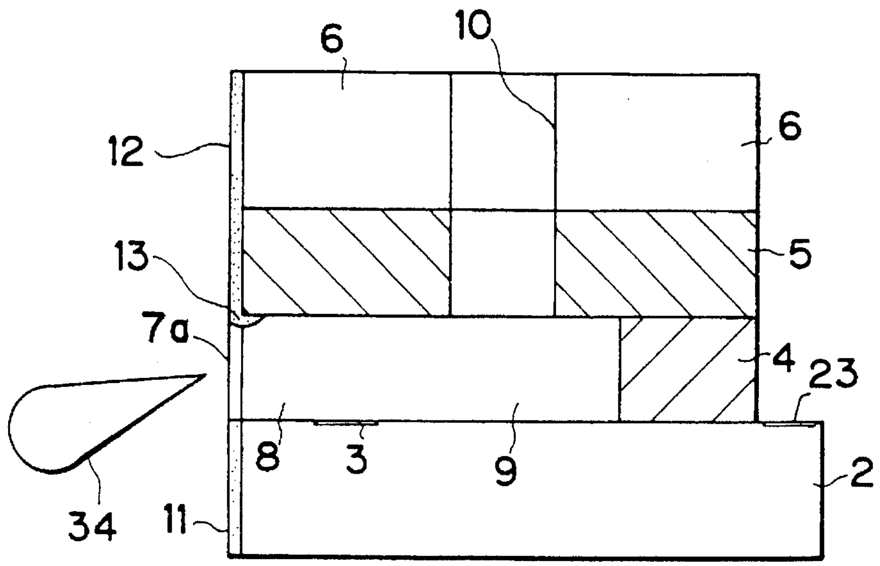
FIG. 5 PRIOR ART
FIG. 5 (Prior Art) is an explanation view showing the relation between a conventional water-repellent treatment for the discharge port and the jetted direction of an ink droplet.
Figure 6:
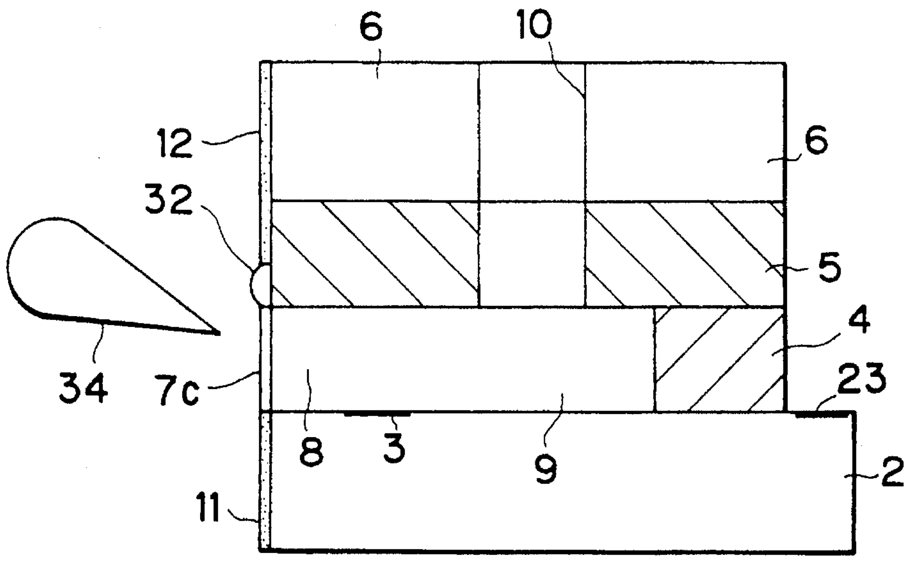
FIG. 6 PRIOR ART
FIG. 6 (Prior Art) is an explanation view showing the relation between the conventional water-repellent treatment for the discharge port and the jetted direction of an ink droplet.
Figure 7A:
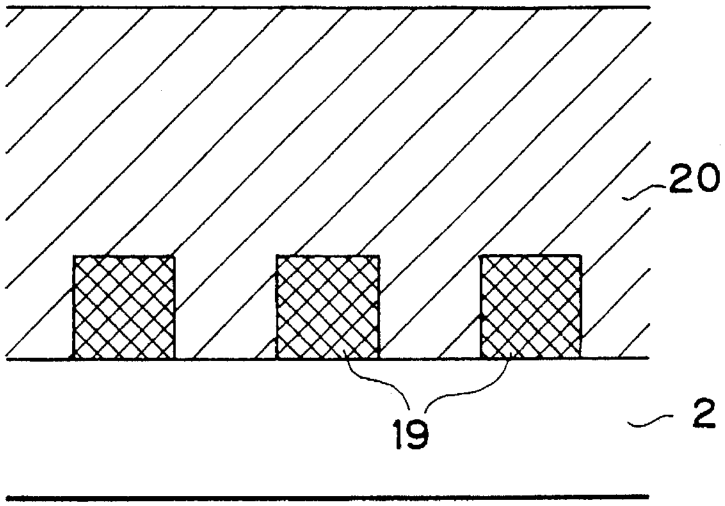
FIG. 7A PRIOR ART
FIGS. 7A and 7B (Prior Art) are explanation views for the conventional discharge port formation and water-repellent treatment.
Figure 7B:
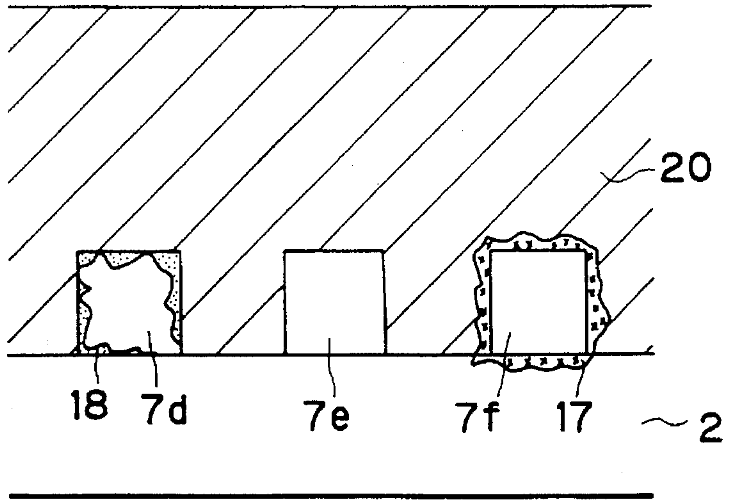
FIG. 7B PRIOR ART
Figure 8A:
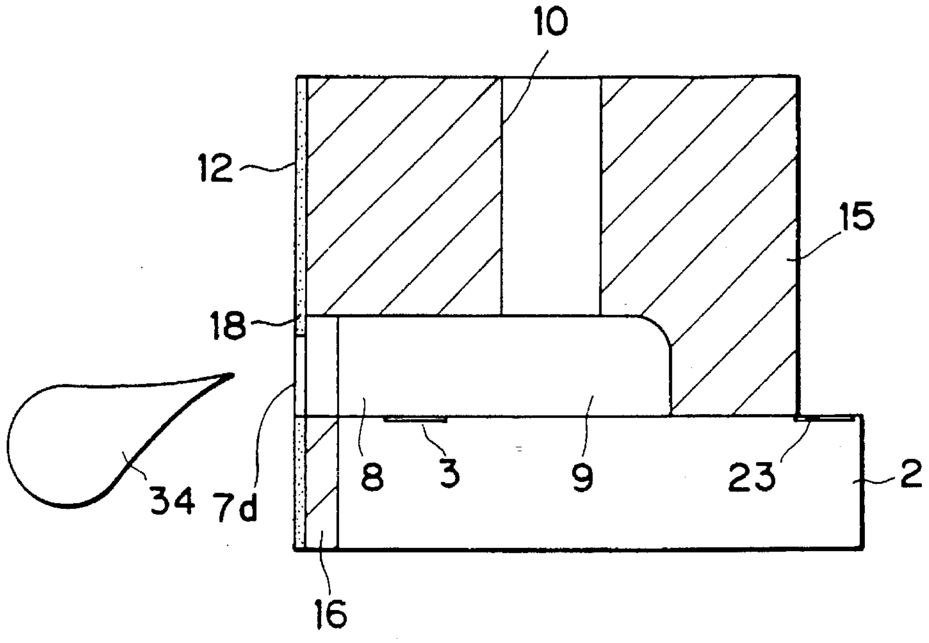
FIG. 8A PRIOR ART
FIGS. 8A and 8B (Prior Art) are explanation views showing the relation between the conventional discharge port formation and water-repellent treatment and the jetted direction of an ink droplet.
Figure 8B:
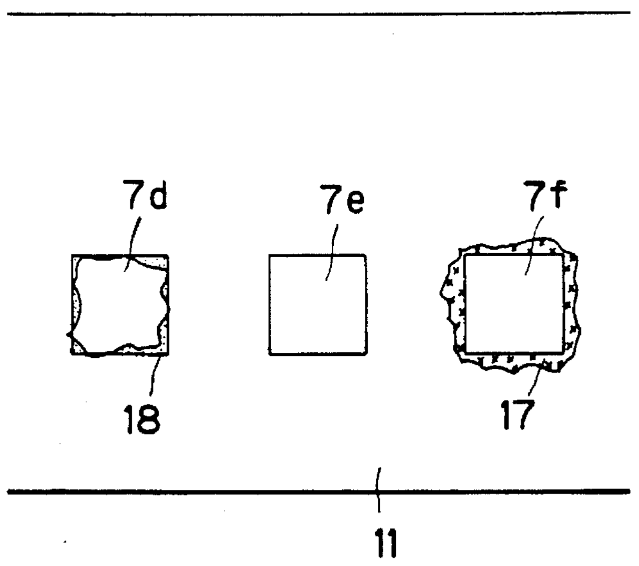
FIG. 8B PRIOR ART

Line 7, "discharge" should read --the discharge--.
Line 15, "FIG. 6," should read --FIG. 5,--.

UNITED STATES PATENT AND TRADEMARK OFFICE

CERTIFICATE OF CORRECTION

PATENT NO. : 5,482,660

DATED : January 9, 1996

INVENTORS : HAJIME YAMAMOTO ET AL.

It is certified that errors appears in the above-identified patent and that said Letters Patent is hereby corrected as shown below:

COLUMN 3

Line 36, "cf" should read --of--.
Line 44, "affairs," should read --problems,--.

COLUMN 6

Line 8, "and" should read --to--.
Line 66, "29" should be boldface.

COLUMN 7

Line 56, "19" should be deleted.
Line 62, "sand blast" should read --sandblast--.

COLUMN 8

Line 34, "8 inch" should read --8 inches--.
Line 52, "silical" should read --silica,--.

UNITED STATES PATENT AND TRADEMARK OFFICE

CERTIFICATE OF CORRECTION

PATENT NO. : 5,482,660

DATED : January 9, 1996

INVENTORS : HAJIME YAMAMOTO ET AL.

It is certified that errors appears in the above-identified patent and that said Letters Patent is hereby corrected as shown below:

COLUMN 9

Line 5, ".in" should read --in--.
Line 49, "a" should read --an--.

COLUMN 10

Line 48, "Snowrex 30" should read --Snowtex 30--.

COLUMN 12

Line 12, "nuclear" should read --nucleate--.

COLUMN 13

Line 38, "sold" should read --solid--.
Line 54, "belt 18" should read --belt 118--.

UNITED STATES PATENT AND TRADEMARK OFFICE

CERTIFICATE OF CORRECTION

PATENT NO. : 5,482,660

DATED : January 9, 1996

INVENTORS : HAJIME YAMAMOTO ET AL.

It is certified that errors appears in the above-identified patent and that said Letters Patent is hereby corrected as shown below:

COLUMN 14

Line 10, "member 30A," should read --member 130A,--.
Line 16, "to-the" should read --to the--.

COLUMN 15

Line 30, "nitrogens" should read --nitrogen--.

Signed and Sealed this

Second Day of July, 1996

Attest:

BRUCE LEHMAN

*Attesting Officer*

*Commissioner of Patents and Trademarks*